United States Patent
Elhamias et al.

(10) Patent No.: US 7,835,518 B2
(45) Date of Patent: Nov. 16, 2010

(54) SYSTEM AND METHOD FOR WRITE FAILURE RECOVERY

(75) Inventors: Reuven Elhamias, Kfar-Vradim (IL); Vivek Venkatraman Mani, Cupertino, CA (US); Niv Cohen, Kibutz Shamir (IL)

(73) Assignee: SanDisk Corporation, Milpitas, CA (US)

( * ) Notice: Subject to any disclaimer, the term of this patent is extended or adjusted under 35 U.S.C. 154(b) by 1224 days.

(21) Appl. No.: 11/397,416

(22) Filed: Apr. 3, 2006

(65) Prior Publication Data

US 2007/0230691 A1 Oct. 4, 2007

(51) Int. Cl.
*H04K 1/04* (2006.01)
*H04K 1/06* (2006.01)

(52) U.S. Cl. ........................................................ 380/37
(58) Field of Classification Search ..................... 380/37
See application file for complete search history.

(56) References Cited

U.S. PATENT DOCUMENTS

| | | | |
|---|---|---|---|
| 5,438,575 A | | 8/1995 | Bertrand et al. |
| 6,065,679 A | * | 5/2000 | Levie et al. ............. 235/462.47 |
| 6,158,004 A | | 12/2000 | Mason et al. |
| 6,295,604 B1 | * | 9/2001 | Callum ........................ 713/160 |
| 6,754,765 B1 | | 6/2004 | Chang et al. |
| 6,829,676 B2 | | 12/2004 | Maeda et al. |
| 6,832,731 B2 | | 12/2004 | Kaneko |
| 6,928,599 B2 | | 8/2005 | Edlis et al. |
| 7,036,020 B2 | | 4/2006 | Thibadeau |
| 7,062,616 B2 | | 6/2006 | Sadhasivan et al. |
| 7,215,771 B1 | | 5/2007 | Hamlin |
| 7,426,747 B2 | | 9/2008 | Thibadeau |
| 7,493,656 B2 | | 2/2009 | Goodwill et al. |
| 2002/0071553 A1 | | 6/2002 | Shirai et al. |
| 2002/0174337 A1 | | 11/2002 | Aihara |
| 2002/0188812 A1 | | 12/2002 | Sadhasivan et al. |
| 2003/0085289 A1 | | 5/2003 | Kaneko |
| 2003/0196028 A1 | | 10/2003 | Maeda et al. |
| 2006/0015754 A1 | | 1/2006 | Drehmel et al. |
| 2006/0050564 A1 | | 3/2006 | Kojima et al. |
| 2006/0107047 A1 | | 5/2006 | Bar-El |
| 2006/0232826 A1 | | 10/2006 | Bar-El |
| 2006/0259790 A1 | * | 11/2006 | Asokan et al. ............. 713/194 |
| 2006/0262928 A1 | | 11/2006 | Bar-El et al. |
| 2006/0294236 A1 | | 12/2006 | Bar-El |
| 2006/0294513 A1 | | 12/2006 | Bar-El et al. |
| 2007/0230690 A1 | | 10/2007 | Elhamias et al. |

FOREIGN PATENT DOCUMENTS

EP 1074906 A1 2/2001
WO WO 02/101976 A 12/2002

OTHER PUBLICATIONS

Office Action for U.S. Appl. No. 11/397,101, dated Jun. 4, 2009, 10 pages.
International Search Report and Written Opinion for PCT/US2007/065679, dated Jul. 6, 2009, 14 pages.

* cited by examiner

*Primary Examiner*—Kambiz Zand
*Assistant Examiner*—Stephen Sanders
(74) *Attorney, Agent, or Firm*—Brinks Hofer Gilson & Lione

(57) ABSTRACT

When cipher block chaining encryption/decryption is employed, write fault recovery is accomplished by storing information useful for the writing of cipher block chaining processed data before it is written to storage cells. Hence when write failure is discovered, this information stored can be retrieved for rewriting the data to the cells. Preferably, the information stored includes security configuration information for cipher block chaining processing a unit of data.

28 Claims, 3 Drawing Sheets

SYSTEM AND METHOD FOR WRITE FAILURE RECOVERY

CROSS-REFERENCE TO RELATED APPLICATIONS

This application is related to U.S. patent application Ser. No. 11/397,101, entitled "System for Write Failure Recovery," filed on the same day as the present application; which application is incorporated by reference as if fully set forth herein.

BACKGROUND OF THE INVENTION

This invention relates in general to memory systems involving encryption/decryption of data, and in particular to a memory system or method for writing data with write failure recovery capability.

Portable storage devices have been in commercial use for many years. They carry data from one computing device to another or to store back-up data. The mobile device market is developing in the direction of including content storage so as to increase the average revenue by generating more data exchanges. This means that valuable content has to be protected when stored on a mobile device. In order to protect the content stored in the portable storage devices, the data stored is typically encrypted and only authorized users are allowed to decrypt the data. This may be performed by means of an engine called a crypto-engine.

Cipher block chaining (CBC) is a method of encryption where the result (in the form of a cipher text block) of the encryption of the previous plain text block is fed back into the encryption of the next plain text block. Thus, each cipher text block is not only dependent on the plain text block, but also on previous plain text blocks. The initiation vector (IV), which is randomized data, is encrypted as the first block in the CBC process in order to provide unique input to the encryption engine, so that for a given plain text key used in the encryption, the cipher text generated would still be unique.

The CBC process is carried out by the crypto-engine which can perform encryption and/or decryption. The context of the engine refers to the current state of the engine at a given time. For a given encryption/decryption cycle, the context generated and used is unique.

When CBC is used for data encryption during a write operation, programming of the storage device may fail. In such event, the data would need to be reprogrammed to the storage device. This would require that the data that has failed to be written during the write operation be transferred again to the storage device. But once the data has already been transferred through the crypto- or encryption/decryption engine using a given context, the same data cannot pass through the engine again without re-configuring the engine with the proper context. It is therefore desirable to provide a solution for the above problem.

SUMMARY OF THE INVENTION

The above described problem can be solved by storing information useful for the writing of cipher block chaining processed data during one or more of programming cycles prior to the writing of such data to the storage device in such cycle(s), so that such data can again be written to the storage device in the event of a write failure.

During at least one of the programming cycles, a unit of data is written to the storage device. In one embodiment, the information that is stored is the unit of data after it has been cipher block chaining processed. In another embodiment, the information stored comprises security configuration or context information for cipher block chaining processing the unit of data.

BRIEF DESCRIPTION OF THE DRAWINGS

For convenience in description, identical components are labeled by the same numbers in this application.

DETAILED DESCRIPTION OF EXEMPLARY EMBODIMENTS

Figure 1:
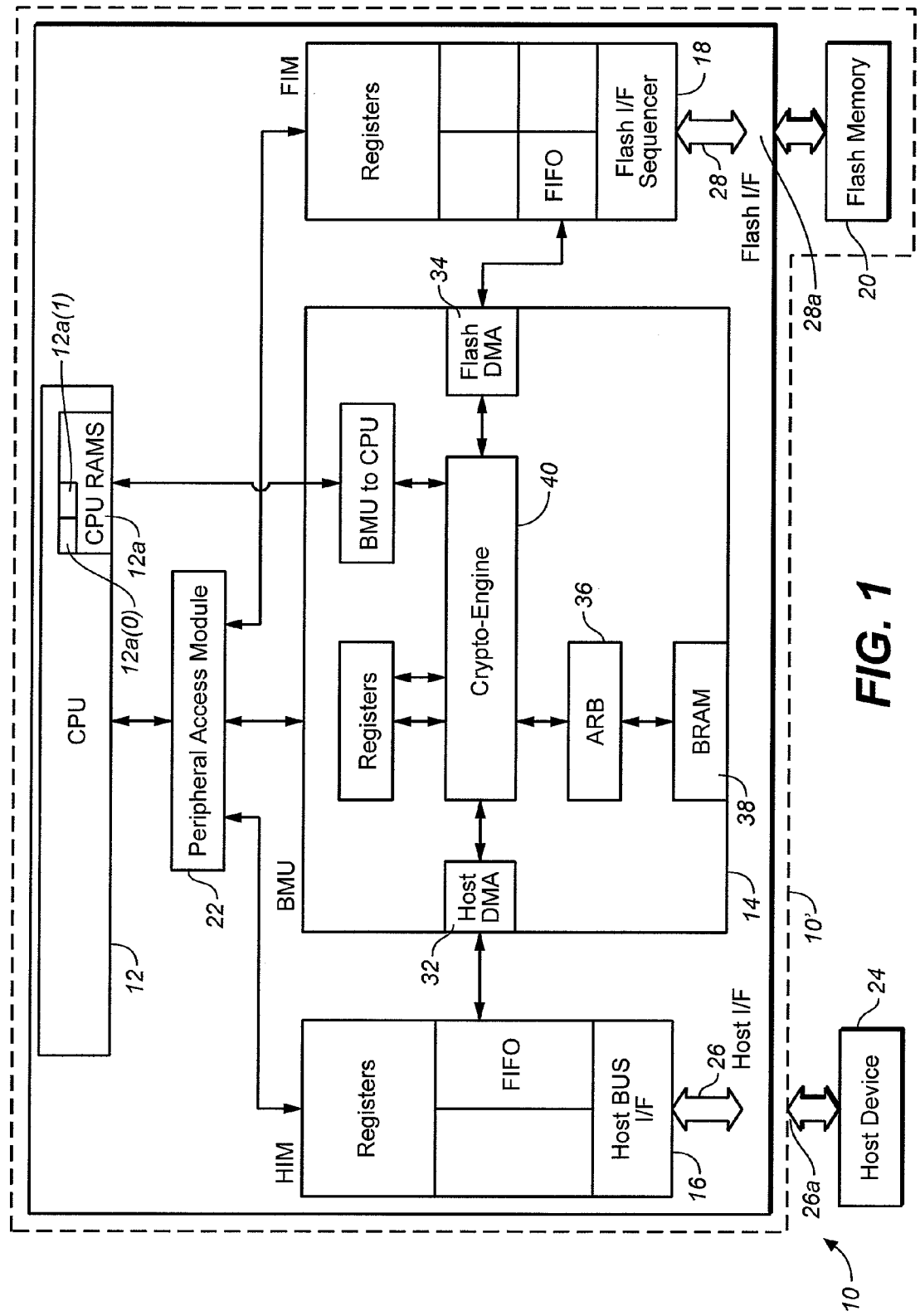
FIG. 1 is a block diagram of a memory system in communication with a host device to illustrate the invention.

An example memory system in which the various aspects of the present invention may be implemented is illustrated by the block diagram of FIG. 1. As shown in FIG. 1, the memory system 10 includes a central processing unit (CPU) 12, a buffer management unit (BMU) 14, a host interface module (HIM) 16 and a flash interface module (FIM) 18, a flash memory 20 and a peripheral access module (PAM) 22. Memory system 10 communicates with a host device 24 through a host interface bus 26 and port 26a. The flash memory 20 which may be of the NAND type, provides data storage for the host device 24. The software code for CPU 12 may also be stored in flash memory 20. FIM 18 connects to the flash memory 20 through a flash interface bus 28 and port 28a. HIM 16 is suitable for connection to a host system like a digital camera, personal computer, personal digital assistant (PDA), digital media player, MP-3 player, and cellular telephone or other digital devices. The peripheral access module 22 selects the appropriate controller module such as FIM, HIM and BMU for communication with the CPU 12. In one embodiment, all of the components of system 10 within the dotted line box may be enclosed in a single unit such as in memory card or stick 10' and preferably encapsulated in the card or stick.

The buffer management unit 14 includes a host direct memory access (HDMA) 32, a flash direct memory access (FDMA) controller 34, an arbiter 36, a buffer random access memory (BRAM) 38 and a crypto-engine 40. The arbiter 36 is a shared bus arbiter so that only one master or initiator (which can be HDMA 32, FDMA 34 or CPU 12) can be active at any time and the slave or target is BRAM 38. The arbiter is responsible for channeling the appropriate initiator request to the BRAM 38. The HDMA 32 and FDMA 34 are responsible for data transported between the HIM 16, FIM 18 and BRAM 38 or the CPU random access memory (CPU RAM) 12a. The operation of the HDMA 32 and of the FDMA 34 is conventional and need not be described in detail herein. The BRAM 38 is used to buffer data passed between the host device 24, flash memory 20 and CPU RAM 12a. The HDMA 32 and FDMA 34 are responsible for transferring the data between HIM 16/FIM 18 and BRAM 38 or the CPU RAM 12a and for indicating sector transfer completion.

When originally encrypted data is written to flash memory 20 by the host device 24, encrypted data from the host is sent through bus 26, HIM 16, HDMA 32, crypto-engine 40 where the encrypted data is decrypted and stored in BRAM 38. The decrypted data is then sent from BRAM 38, through FDMA 34, FIM 18, bus 28 to flash memory 20. The data fetched from BRAM 38 may again be encrypted by means of crypto-engine 40 before it is passed to FDMA 34 so that the data sent to the flash memory 20 is again encrypted but by means of a different key and/or algorithm compared to the those whereby the data from the host device 24 is decrypted. This illustrates the data stream during a writing process.

When unencrypted data is sent by host device, through bus 26, HIM 16, HDMA 32 to the crypto-engine 40, such unencrypted data may be stored in BRAM 38. The data is then encrypted before it is sent to FDMA 34 on its way to memory 20. Where the data written undergoes multistage cryptographic processing, preferably engine 40 completes such processing before the processed data is sent to memory 20.

In many applications, it may be desirable to perform data encryption in real time when data is written to storage devices such as memory 20, known as on the fly data encryption. This is more efficient, since the data does not need to be stored for the purpose of encryption as an intermediate step before the data is written to the storage device. Thus when unencrypted or encrypted data is sent from the host 24 to the memory 20, preferably the encryption is done on the fly.

In the process described above, the data stream is between the host device 24 and memory 20. Thus, the data source is then host device 24 and the destination is memory 20. In addition, the data source can also be the CPU 12 and the corresponding destination is the memory 20 in the writing operation. Whether the data source is host device 24 or CPU 12, the data for storage in the flash memory 20 is first cryptographically processed by engine 40 before it is written to memory 20.

While the memory system can in FIG. 1 contains a flash memory, the system may alternatively contain another type of non-volatile memory instead, such as magnetic disks, optical CDs, as well as all other types of rewritable non-volatile memory systems, and the various advantages described below will equally apply to such alternative embodiments. In the alternative embodiments, the memory is also preferably encapsulated within the same physical body (such as a memory card or stick) along with the remaining components of the memory system.

When data stored in BRAM 38 (originating from either host device 24 or CPU 12) is written to flash memory 20, the data is written in programmable units known as metapages, where a metapage is written to flash memory 20 during each programming cycle of the CPU 12. One metapage may include a number of sectors, the size of the sector being defined by the host system. An example is a sector of 512 bytes of user data, following a standard established with magnetic disk drives, plus some number of bytes of overhead information about the user data and/or the metapage of which it is a part.

The crypto-engine 40 performs the cryptographic process or processes using cryptographic algorithms and cryptographic keys. Many common cryptographic algorithms process 128 bits of data as a cryptographic processing unit. This is typically smaller than the size of metapages of data that are written during each programming cycle to flash memory 20.

When a crypto-engine 40 performs CBC process on the data, crypto-engine 40 performs the CBC process on each plain text block (which in this case consists of a cryptographic processing unit) of the data stream and obtains a corresponding cipher text block. Thus the resulting cipher text block of each cryptographic processing unit depends not only on the corresponding cryptographic processing unit, but also on the previous cryptographic processing units.

Figure 2:
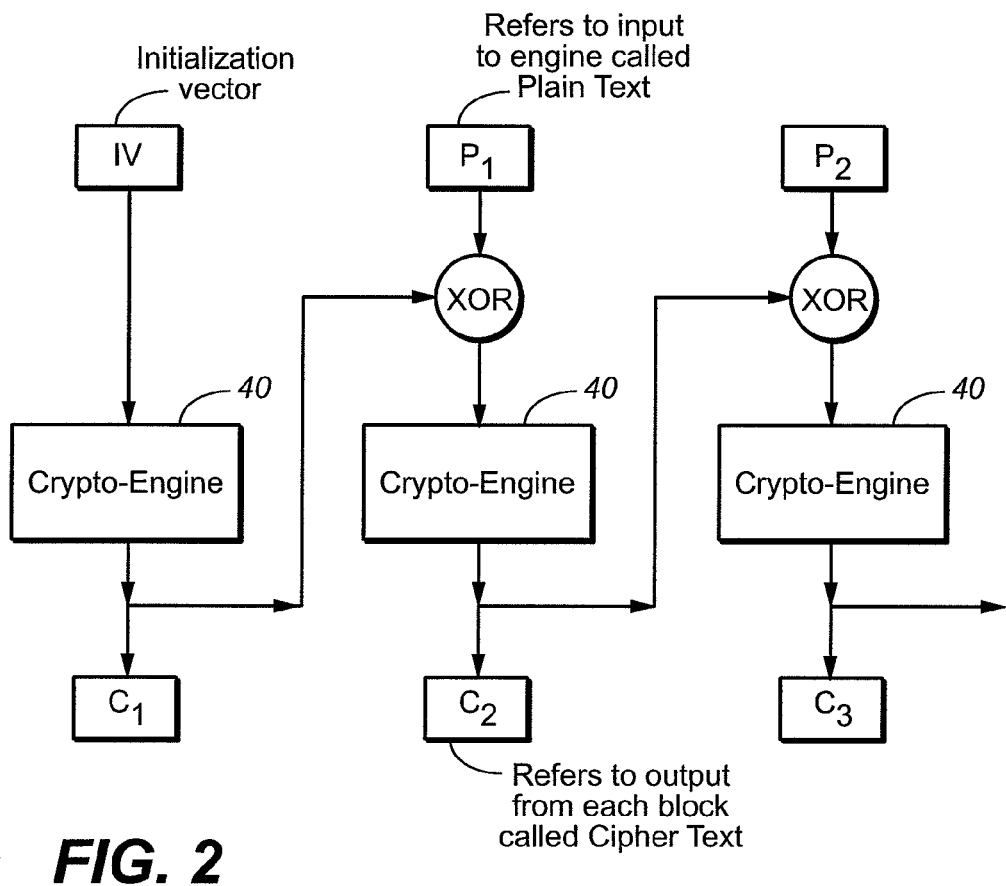
FIG. 2 is a block diagram of a CBC process useful for illustration the invention.

FIG. 2 is a block diagram of a CBC process useful for illustrating the invention. As shown in FIG. 2, when processing the first metapage, the CBC process starts out with a random number called the initialization vector (IV). This number is encrypted by engine 40 using a key to arrive at a block of cipher text $c_1$. The value $c_1$ and the first plain text block $p_1$ of the metapage are fed as inputs to an XOR gate, where the output of the gate is then encrypted again using a key to obtain cipher text $c_2$. This operation is then repeated with $c_2$ and plain text block $p_2$ as inputs to a XOR gate where the output of the gate is encrypted by means of a key to obtain cipher text $c_3$. This process continues in the same manner until all of the plain text blocks in the metapage have been encrypted. Then the same process will begin for the second metapage and all of the metapages that follow, using the last cipher text block from the previous metapage instead of the initialization vector (IV).

The cipher text blocks are also referred to as message authentication codes (MAC) of the data stream. Thus, the encryption and decryption CBC functions for the first metapage of the type in FIG. 2 may be represented as follows:

Encryption.

Input: m-bit key k; l-bit IV; l-bit plain text blocks
$p_1, \ldots, p_r$.

Output: $c_0, \ldots, c_r$ such that $c_0 \leftarrow IV$ and
$c_i \leftarrow e_k(c_{i-1} \oplus p_i)$ for $1 \leq i \leq r$.

Decryption.

Input: m bit key k; l-bit IV; l-bit cipher text blocks
$c_1, \ldots, c_r$.

Output: $p_0, \ldots, p_r$ such that $p_0 \leftarrow IV$ and
$p_i \leftarrow c_{i-1} \oplus e_k^{-1}(c_i)$ for $1 \leq i \leq r$.

The values $c_0, \ldots, c_r$ above are the cipher text blocks or message authentication codes (MAC) of the metapage in the data stream, comprising plain text blocks $p_1, \ldots, p_r$. IV is the initiation vector, and k is a key. Thus, when it is desirable to encrypt and write a metapage containing blocks of data $p_1, \ldots, p_r$ to memory 20, the MAC values (e.g. $c_0, \ldots, c_r$) are calculated from the blocks of data by the Crypto-engine 40 in system 10 using a function such as the CBC function above, and the MAC values are written to memory 20. In the above formulas, $e_k(x)$ means a process where x is encrypted by means of key k and $e_k^{-1}(x)$ means x is decrypted using the key k.

In the above encryption process, it will be observed that in order to encrypt each metapage (except for the first metapage), engine 40 will need to employ the last message authentication code or cipher text $c_r$ from the previous metapage instead of IV. To encrypt the first metapage, engine 40 will need to employ the initiation vector IV.

Write Fault Recovery:

From the above, it will be observed that after encryption using CBC, the encrypted cipher text blocks or MAC values of each metapage in the data stream are as follows: $c_0, \ldots, c_r$. These cipher text blocks are then written to flash memory 20.

If there is a problem in writing the Ith metapage, this sequence of MAC values of encrypted metapage will need to be once again written to flash memory 20. Since the crypto-engine 40 normally does not store encrypted data, such encrypted data no longer exists.

In order to be able to retry the writing process of the Ith metapage, the entire encrypted Ith metapage, or $c_0, \ldots, c_r$, can be stored somewhere in system 10, such as in a data buffer in memory 20 or RAM 12a, so that when a problem is discovered in the writing process of the encrypted Ith metapage to flash memory 20, the stored encrypted metapage can be fetched again and re-written to flash memory 20. In this manner, the encrypted Ith metapage is not destroyed during the programming sequence so that it may be fetched later on in the event of a write failure. In addition, the programming code of CPU 12 includes a program command with no data transfer from the BRAM 38. Instead, the program command would use the data buffer in a flash memory 20 or RAM 12a as the data source and data is written again to the flash memory 20. These programming modes can then be used when a write failure is discovered.

Storing the encrypted metapage in a flash memory 20 or RAM 12a would require the flash memory 20 or RAM 12a to include a large size buffer adequate for storing the entire encrypted metapage. Thus, preferably and as an alternative, one stores only the necessary information to restore engine 40 to the proper state so that it can continue to process again the plain text blocks in the metapage that failed to be written after the discovery that the process of writing such encrypted metapage has failed. The unencrypted metapage may again be fetched from BRAM 38 and processed by engine 40, and the processed metapage rewritten to memory 20. Thus, before the current metapage is being processed by engine 40, context information or security configuration information of engine 40 is first stored in a buffer, such as in RAM 12a of FIG. 1. Such information preferably includes the last message authentication code or MAC value $c_r$ of the previous metapage, the various values of the registers of engine 40, the cryptographic algorithm that is being used for the processing, and optionally information to identify the metapage (or its location) that needs to be rewritten, for reasons explained below. In the case where the first metapage is to be written, such stored information preferably includes the initiation vector IV instead of the last message authentication code or MAC value of the previous metapage. After storing such information, the CPU 12 returns control to the FIM and FDMA which process the current metapage$_i$, cause it to be encrypted by engine 40, and then write the encrypted current metapage to flash memory 20.

In some embodiments, it may be desirable to employ a buffer (not shown) between the FIM 18 and memory 20 to cache the encrypted metapage before it is written to flash memory 20, such as one or more sectors of the metapage being processed. This buffer may also be part of the FIM 18 or memory 20.

Although only portions of one metapage are cached, it is possible for data of both the currently processed metapage and the cached metapage to be written to the flash memory 20 at the same time. In such event, one will need to be able to determine how far the system should go back in the data stream (i.e. whether the currently processed metapage or the following metapage that is cached) to perform data encryption and rewriting to memory 20 when a write failure is discovered. For this purpose, the security configuration or context information stored preferably also includes the starting logical block addresses (LBAs) of the metapages that may be written to memory 20 at the same time, so that when it is discovered that the writing process of one of such metapages has failed, the system can be returned to the beginning address of such one metapage in order to rewrite it in encrypted form to flash memory 20.

As noted above, in a first technique for solving the problem of write failure, all of the large number of cipher text blocks are stored, either in the flash memory 20, or in RAM 12a; this means that significant storage space in either the flash memory or the RAM 12a is required. This is the case since it is not known ahead of time precisely in what portion of the metapage that the write failure occurred. For this reason, all of the cipher text blocks are stored so that they can be rewritten to the flash memory.

In contrast, in the second technique where only the security configuration information or context information of the metapage is stored, it is not necessary to store all of the cipher text blocks of the metapage. Instead, only the last cipher text block of the previous metapage or the initiation vector will need to be stored, in addition to information for restoring engine 40 to the proper state. This last cipher block text from the previous metapage or the initiation vector may then be fed as an input along with the first plain text block in the current metapage to a XOR gate, where the output of the gate is input to engine 40 to perform the encryption. In this manner, it is no longer necessary to provide the capacity in either the flash memory or the RAM 12a for storing all of the cipher text blocks of any metapage.

Figure 3:
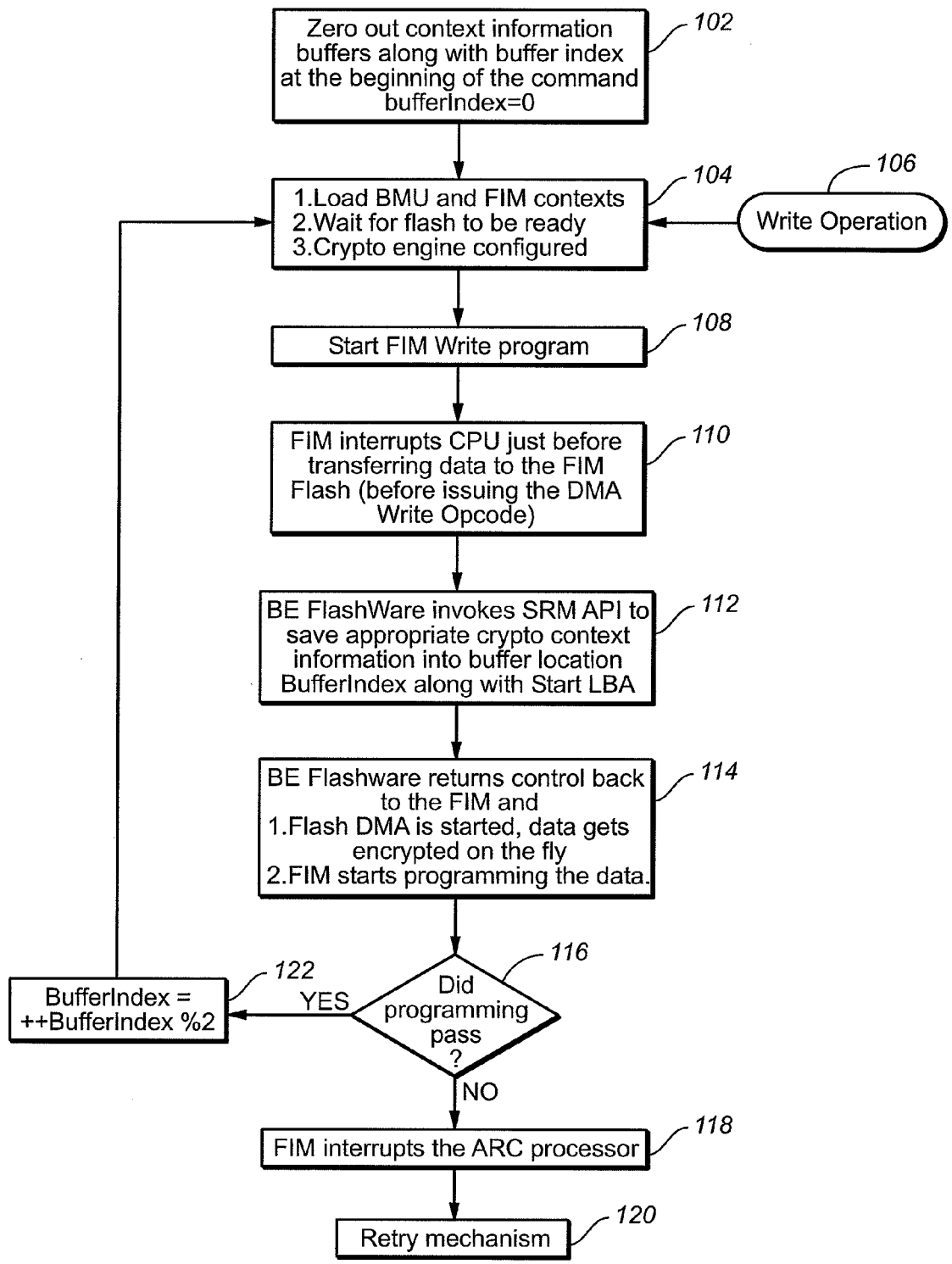
FIG. 3 is a flow chart illustrating an operation of the system in FIG. 1 in writing data to the storage device where security configuration information is stored to illustrate one embodiment of the invention.

As noted above, it is possible for data from two metapages to be processed and written to flash memory 20 at the same time. For this reason, two buffers in RAM 12a are used to store the security configuration information of the two metapages being processed. Obviously, where it is possible for three or more metapages to be written to memory 20, then three or more buffers are used instead; such and other variations are within the scope of the invention. Assuming that two metapages may be written to flash memory 20 at the same time, a parameter called bufferindex is used to keep track of the two sets of security configuration information stored in the two buffers so that the correct security configuration information is restored for re-processing the corresponding metapage when write failure occurs. Thus the two buffers for storing the security configuration information may be labeled 12a(0) and 12a(1) and the bufferindex would toggle between 0 and 1 to point to one of the two buffers for storing security configuration information. The process for write fault recovery by means of storing the security configuration information is illustrated in FIG. 3.

First the CPU 12 zeros out the context or security configuration information stored in the two buffers 12a(0) and 12a(1) and set the value of bufferindex to 0. (Block 102.) The settings or context are loaded to the buffer management unit 14 and FIM 18 by CPU 12. This sets up the FDMA 34 and causes FIM 18 to be ready to process data. The crypto-engine 40 is also configured. After such loading, CPU 12 waits until flash memory 20 is ready to receive data (Block 104). System 10 is then ready for write operation 106.

CPU 12 causes the FIM write program to start and transfers control of the various buses to FIM 18. (Block 108). FIM 18 interrupts the CPU 12 just before transferring data from BRAM 38 to FIM 18 and flash memory 20, that is, before issuing the DMA write operation code (Block 110). The back end (BE) Flash Ware and suspend/resume module (SRM) API are software read from a storage such as flash memory 20 to CPU RAM 12a. The BE Flash Ware is executed by CPU 12 to invoke SRM API for saving crypto context or security configuration information of the metapage and of the engine 40 into the buffer that is pointed to by the value of the bufferindex. Thus, upon initiation, since the bufferindex has been set to 0, this information is then stored in buffer 12a(0). Also stored in buffer 12a(0) is the starting logical block address of the metapage being written in this write operation. (Block 112)

The BE Flash Ware executed by CPU 12 then returns control of the device 10 back to FIM 18. The CPU 12 also causes the FDMA 34 to be started, so that data from BRAM 38 from the metapage is starting to be encrypted by cryptoengine 40 and written to memory 20. (Block 114). The FIM 18 then checks to see whether the programming of the entire metapage to flash memory 20 is completed indicating that the programming of such metapage passes. (Diamond 116). If the metapage is successfully written to flash memory 20 without incident, the bufferindex is incremented by one and then divided by two (or modulo 2) to obtain the remainder. (Block 122) In this instance where the bufferindex has been set to 0, such operation causes bufferindex to be 1 in block 122 and FIM 18 returns control to the CPU 12 in Block 104 to repeat the process for the next metapage. In the next cycle for writing the next metapage, the context or security configuration information will be written to buffer 12a(1) instead, since the bufferindex has been set to 1.

Figure 4:
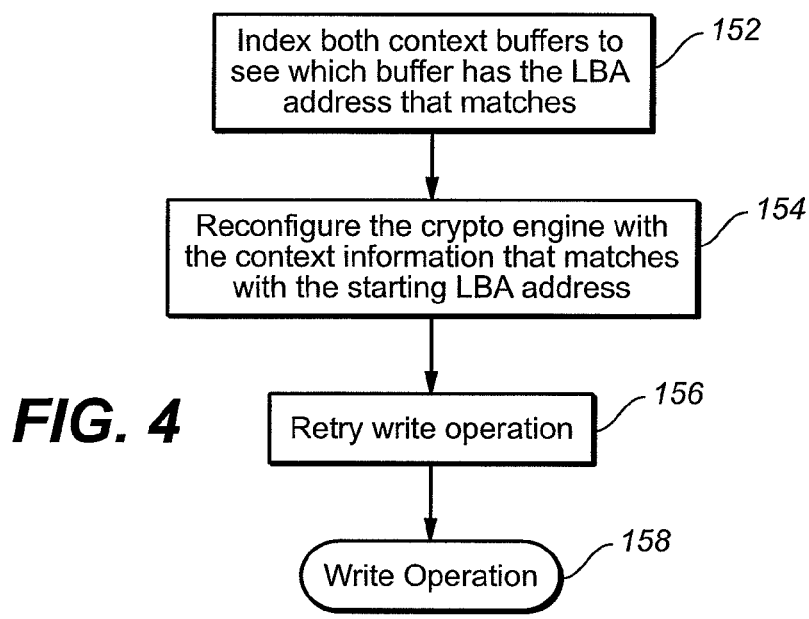
FIG. 4 is a flow chart illustrating the operation of the system in FIG. 1 where the security configuration information stored is used to reconfigure the crypto-engine in retrying the write operation of the data that failed to be written previously, for illustrating an embodiment of the invention.

If the programming did not pass, however, the FIM 18 then interrupts the processor 12 (Block 118) and the write operation is re-tried using a retry mechanism 120. The retry mechanism is illustrated in FIG. 4. In reference to FIG. 4, when FIM 18 discovers a failure of the write operation, the FIM 18 is aware of the location of the write failure and in which metapage the write failure occurred. FIM 18 is therefore aware of the beginning logical block address (LBA) of the metapage in which the write failure occurred. This address is then matched with or compared to the starting LBA address in the two buffers 12a(0) and 12a(1) and identifies the buffer that contains the LBA address that matches that of the metapage at which the write failure occurred. (Block 152) The context or security configuration information stored in such buffer that has been identified is then used to restore the state of the crypto-engine 40. (Block 154). The CPU 12 then activates FIM 18, FDMA 34, and engine 40 to again encrypt the metapage from BRAM 38 starting at the beginning logical block address of the metapage at which the write failure occurred and write the encrypted metapage to flash memory 20 as before. (Blocks 156, 158). The FIM 18 also deletes or marks for deletion whatever incomplete encrypted metapage(s) that may have been written to memory 20. After this operation has been completed, CPU 12 returns the operation to Block 104 of FIG. 3.

As noted above, it is possible for data from more than one metapage to be written or programmed to memory 20 during the same cycle. Thus, if the write error occurs when data from one metapage is being written to memory 20, it may be necessary or desirable to rewrite or reprogram not only such metapage, but also the metapage(s) preceding it when data from the preceding metapage(s) is also being written to memory 20. Thus, when write failure occurs, the CPU 12 will determine how far back the rewriting or reprogramming of data should go. In other words, the CPU 12 will determine whether to rewrite or reprogram just the metapage at which the write failure occurred, or whether to rewrite or reprogram also the metapage(s) preceding it as well. Preferably, the preceding metapage(s) are also rewritten or reprogrammed if they have not been completely written to memory 20 even though no write failure occurred during their programming. In one implementation where it is possible for two metapages to be written during the same cycle, the status of the programming of a particular metapage is known only after the next cached metapage finishes programming. In such event, CPU 12 will always go back two metapages (i.e. the metapage in which the write error occurred and the preceding one) for reprogramming, except that for the last metapage, it will only reprogram the last metapage.

By indexing three or more buffers in RAM 12a instead of two, the above described process can be readily extended to applications where three or more buffers are used to store the context or security configuration information and the beginning logical block addresses of three or more corresponding metapages. The above operation pertains to write failure recovery when metapages are encrypted. Essentially the same process would apply where encrypted data in BRAM 38 is to be decrypted before it is written to memory 20. While embodiments of this invention have been illustrated by reference to on the fly data cryptographic processing, it will be understood that it may apply as well to systems that do not perform on the fly data cryptographic processing during the data writing process. While the embodiments above refer to various examples of specific sizes of data blocks being processed by engine and various sizes of the metapages, it will be understood that the same advantages will apply for different sizes of data blocks processed by engine 40 and of metapages. For some applications, when write failure is detected, it may be desirable for the system to go back, not to the beginning of the metapage in which the write failure occurred, but to the sector within such metapage, for encrypting and re-writing to memory 20 such sector and all sectors in such metapage that follow such sector in the data stream. In this manner, the system can avoid having to encrypt the sectors in such metapage that precede the sector where the write failure occurred. This may improve efficiency. All such and other variations are within the scope of the invention.

While the invention has been described above by reference to various embodiments, it will be understood that changes and modifications may be made without departing from the scope of the invention, which is to be defined only by the appended claims and their equivalent. All references referred to herein are incorporated by reference in their entireties.

What is claimed is:

1. A method for processing data in a memory system for storing encrypted data comprising non-volatile memory cells and a cryptographic circuit, the method comprising:

causing the circuit to perform cipher block chaining processes on data in a data stream to be written to the cells;

writing data in the data stream to the cells in sequential programming cycles, so that data in the data stream is processed by a cipher block chaining process by the circuit before it is written to the cells; and during at least one of the programming cycles, causing information, with which the circuit can perform cipher block chaining processes on data of the at least one of the programming cycles without performing cipher block chaining processes on data of at least a part of previous programming cycles, to be stored prior to the writing of such data to the cells, so that such data can again be written to the cells after being cipher block chaining processed and after discovery of a write failure.

2. The method of claim 1, further comprising:

detecting a failure in the writing of cipher block chaining processed data in such cycle to the cells; and writing to the cells the cipher block chaining processed data using the stored information.

3. The method of claim 2, further comprising causing the circuit to perform a cipher block chaining process on data that failed to be written to the cells, using the stored information to obtain in such process the cipher block chaining processed data that is again written to the cells.

4. The method of claim 3, wherein writing data in the at least one programming cycle includes writing a unit of data to the cells, and wherein storing includes storing the unit of data after the unit of data has been cipher block chaining processed.

5. The method of claim 3, wherein writing data in the at least one programming cycle includes writing a unit of data to the cells, and wherein storing includes storing security configuration information for cipher block chaining processing the unit of data.

6. The method of claim 5, wherein the security configuration information includes cryptographic key, cryptographic algorithm, and/or one of the following: message authentication codes and an initiation vector.

7. The method of claim 6, further comprising retrieving the stored security configuration information, the stored security configuration information including message authentication codes and/or an initiation vector, and deriving updated message authentication codes from the retrieved message authentication codes and/or an initiation vector.

8. The method of claim 5, wherein during each of at least two consecutive programming cycles, storing includes storing security configuration information for the cipher block chaining processing of the unit of data for such cycle prior to the writing of such data to the cells.

9. The method of claim 8, wherein the security configuration information includes location information for locating the unit of data.

10. The method of claim 9, further comprising:
caching one or more portions of at least one cipher block chaining processed unit of data before the at least one cipher block chaining processed unit of data is written to the cells, wherein writing includes writing data from the at least one cipher block chaining processed unit and another unit to the cells during the at least one cycle, and wherein detecting includes detecting, among the cached unit(s) of data and the another unit, which unit of data has failed to be written to the cells;
locating the detected unit of data that has failed to be written in a form prior to cipher block chaining processing using the location; and
causing the circuit to perform cipher block chaining processes on the detected unit of data.

11. The method of claim 10, wherein the detected unit of data is one whose one or more portions has been cached, and wherein causing includes causing the circuit to perform cipher block chaining processes on the detected unit of data and on all unit(s) of data that precede the detected unit of data in the data stream and that have not been completely written to the cells.

12. The method of claim 11, further comprising deleting, or marking as unit(s) to be deleted, from the cells any unit that has not been completely written to the cells.

13. A method for processing data in a memory system for storing encrypted data comprising non-volatile memory cells and a cryptographic circuit, the method comprising:
causing the circuit to perform cipher block chaining processes on data in a data stream;
writing data in the data stream to the cells in sequential programming cycles, so that data in the data stream is processed by the circuit before it is written to the cells;
writing cipher block chaining processed data from the data stream to the cells in sequential programming cycles; and
during at least one of the programming cycles, causing an encrypted metapage to be stored prior to the writing of such data to the cells so that the encrypted metapage can be fetched and re-written to the cells after being cipher block chaining processed and after discovery of a write failure.

14. The method of claim 13, wherein the encrypted metapage is an entire encrypted metapage.

15. A memory system for storing encrypted data, comprising:
non-volatile memory cells;
a circuit operative to perform cipher block chaining processes on data in a data stream to the cells; and
a controller operative to write cipher block chaining processed data from the data stream to the cells in sequential programming cycles, wherein during at least one of the programming cycles, the controller is operative to cause information, with which the circuit can perform cipher block chaining processes on data of the at least one of the programming cycles without performing cipher block chaining processes on data of at least a part of previous programming cycles, to be stored prior to the writing of such data to the cells, so that such data can again be written to the cells after being cipher block chaining processed and after discovery of a write failure.

16. The system of claim 15, wherein the controller is operative to detect a failure in the writing of cipher block chaining processed data in such cycle to the cells, and is operative to writes again to the cells the cipher block chaining processed data using the stored information.

17. The system of claim 16, the controller is operative to cause the circuit to perform cipher block chaining processes on data that failed to be written to the cells after such data has been cipher block chaining processed, using the stored information to obtain the cipher block chaining processed data that is again written to the cells.

18. The system of claim 17, wherein the writing of data in the at least one programming cycle writes a unit of data to the cells, wherein the controller is operative to store the unit of data after it has been cipher block chaining processed.

19. The system of claim 17, wherein the writing of data in the at least one programming cycle writes a unit of data to the cells, wherein the controller is operative to store security configuration information for cipher block chaining processing the unit of data.

20. The system of claim 19, wherein the security configuration information includes a cryptographic key, a cryptographic algorithm, and/or one of the following: message authentication codes and an initiation vector.

21. The system of claim 20, wherein the controller is operative to retrieves the security configuration information, the security configuration information including message authentication codes and/or an initiation vector, and wherein the controller is operative to derive updated message authentication codes from the retrieved message authentication codes.

22. The system of claim 19, wherein during each of at least two consecutive programming cycles, the controller is operative to store security configuration information for the cipher block chaining processing of the unit of data for such cycle prior to the writing of such data to the cells.

23. The system of claim 22, wherein the security configuration information that is stored includes location information for locating the unit of data.

24. The system of claim 23, further comprising a storage operative to cache one or more portions of at least one cipher block chaining processed unit of data before the portion(s) are written to the cells, wherein the controller is operative to write data from the at least one cipher block chaining processed unit and another unit to the cells during the at least one cycle, and wherein the controller is operative to detect, among the cached unit(s) of data and the another unit, which unit of data has failed to be written to the cells, and locates the detected unit of data in a form prior to cipher block chaining processing using the location information, wherein the controller is operative to cause the circuit to perform cipher block chaining processes on such unit of data.

25. The system of claim 24, wherein the detected unit of data is one whose one or more portions has been cached, and wherein the controller is operative to cause the circuit to perform cipher block chaining processes on such unit of data as well as on all unit(s) of data that precede such unit in the data stream and that have not been completely written to the cells.

26. The system of claim 25, wherein the controller is operative to delete, or marks as unit(s) to be deleted, from the cells any unit that has not been completely written to the cells.

27. A memory system for storing encrypted data, comprising:
   non-volatile memory cells;
   a circuit operative to perform cipher block chaining processes on data in a data stream to the cells; and
   a controller operative to write cipher block chaining processed data from the data stream to the cells in sequential programming cycles, wherein during at least one of the programming cycles, the controller is operative to cause an encrypted metapage to be stored prior to the writing of such data to the cells so that the encrypted metapage can be fetched and re-written to the cells after being cipher block chaining processed and after discovery of a write failure.

28. The memory system of claim 27, wherein the encrypted metapage is an entire encrypted metapage.

* * * * *